United States Patent [19]
Wheatley et al.

[11] Patent Number: 5,636,893
[45] Date of Patent: Jun. 10, 1997

[54] FOLDING HARD PANEL TONNEAU COVER WITH RAIL ATTACHMENT

[76] Inventors: Donald E. Wheatley, 1119 Wright St.; Donald G. Wheatley, 4451 Ford Rd., both of Ann Arbor, Mich. 48105

[21] Appl. No.: 423,075

[22] Filed: Apr. 17, 1995

[51] Int. Cl.⁶ ............................................. B60P 7/08
[52] U.S. Cl. .................. 296/100; 16/354; 248/316.4; 248/316.6; 248/503
[58] Field of Search ................... 296/100; 248/316.4, 248/316.6, 503, 505; 16/354, 273

[56] References Cited

U.S. PATENT DOCUMENTS

| | | | |
|---|---|---|---|
| 2,086,091 | 7/1937 | Payette | 296/100 |
| 4,313,636 | 2/1982 | Deeds | 296/100 |
| 4,399,640 | 8/1983 | Porter | 160/368.1 X |
| 4,844,531 | 7/1989 | Kooiker | 296/100 |
| 4,861,092 | 8/1989 | Bogard | 296/100 |
| 4,946,217 | 8/1990 | Steffens et al. | 296/100 |
| 4,999,879 | 3/1991 | Baer | 16/354 |
| 5,121,960 | 6/1992 | Wheatley | 248/503 X |

OTHER PUBLICATIONS

"Roton Continuous Geared Hinges" brochure, 8 total pages (#5–500–1550 Jun. 1993).

Primary Examiner—David M. Mitchell
Assistant Examiner—Kia M. Robinson
Attorney, Agent, or Firm—Harness, Dickey & Pierce, P.L.C.

[57] ABSTRACT

A folding hard panel tonneau cover for a pickup truck cargo box having a pair of rails for mounting the tonneau cover to the side walls of a pickup truck cargo box. The rails carry a seal member having a pair of deflectable walls forming a receiving pocket extending the length of the rails. The panels of the tonneau cover have frame members along their side edges which include a downwardly projecting tongue which is insertable into the receiving pocket by deflection of the seal member walls. The receiving pocket and tongue thus serve as a latch means for attaching the panels to the cargo box side wall and also provide a water tight seal to prevent water from entering into the cargo box. Identically shaped frame members at the front and rear edges of the tonneau cover carry rubber seals for engagement with the front wall and tailgate of the cargo box. Continuous gear hinges are used to pivotally join the panels together to fold in an accordion-style fashion.

14 Claims, 6 Drawing Sheets

FOLDING HARD PANEL TONNEAU COVER WITH RAIL ATTACHMENT

BACKGROUND AND SUMMARY OF THE INVENTION

The present invention relates to a folding hard panel tonneau cover for a pickup truck cargo box having a plurality of panels pivotally connected to one another to fold in an accordion-style fashion about hinges. The invention, in particular, relates to a cover having an improved latch and seal for both retaining the panels on the cargo box and for preventing water from entering the cargo box and to a cover having continuous gear hinges joining the panels to one another.

The cargo box of a conventional pickup truck is open and therefore exposed to the weather. Depending upon the cargo being transported, it may be desired to protect the cargo from the weather. Various types of covers have been developed for covering the cargo box including cargo box caps, rigid one-piece fiberglass covers and flexible vinyl coated fabric covers.

Folding hard panel tonneau covers have also been developed which have a plurality of hard panels pivotally attached to one another by hinges that extend transversely of the cargo box, enabling the panels to fold accordion-style to uncover the box. In a closed position, the tonneau cover lies flat on top of the cargo box walls, covering the cargo box open upper end. The hard panel cover can also be equipped with locks to secure the cover in place. This locking capability is not available with vinyl coated fabric tonneau covers. The folding panel tonneau cover can easily be opened by folding the panels, one on top of the other, to substantially open the cargo box. This ease of opening the cargo box is a significant advantage over the one-piece molded fiber glass tonneau covers and cargo box caps which are difficult to remove in order to open the cargo box.

Hard panel tonneau covers, however, have their own disadvantages. One disadvantage is the difficulty in providing a water tight seal between the panels and the cargo box walls. Another disadvantage is the difficulty in securing the panels to the cargo box in a manner which prevents wind forces, generated during operation of the truck, from lifting the panels off the cargo box.

It is the object of the present invention to provide an improved seal structure for the folding panel tonneau cover that securely retains the panels to the cargo box to prevent lifting caused by wind forces and that provides a water tight seal to prevent water from entering the cargo box.

The tonneau cover of the present invention includes a pair of elongated rails attached to the cargo box with one rail on each of the cargo box side walls. Each rail carries an elongated plastic extrusion which forms elongated receiving pockets having flexible side walls.

Each of the individual panels of the tonneau cover includes an extruded perimeter frame. Along the side edges of the panels, the frame includes a downwardly extending flange or tongue which has an enlarged distal end. The tongue is inserted into the receiving pocket carried by each side rail to latch the panels in place upon the cargo box. The tongue is held in the receiving pocket to prevent the panels from being lifted by wind forces. In addition, the engagement of the tongue with the receiving pocket produces a water tight seal, preventing water from entering the cargo box. The frame along the panel side edges also forms an extending lip which covers the tongue and the receiving pocket carried by the rails. The lip provides a path to divert water from the top of the tonneau cover, over the lip and onto the side wall of the cargo box.

The same frame section is used at the front and rear edges of the tonneau cover over the front wall and tailgate of the cargo box. The front and rear frame sections carry a rubber gasket which seals against the front wall and tailgate of the cargo box, providing a water tight seal at the front and rear of the tonneau cover.

A lock is provided to lock the rear panel of the cover to the rails attached to the cargo box side walls. The font panel is bolted to the rails to hold it in place. A catch is provided to prevent the tailgate from being opened without first lifting the rear hard panel. This prevents unauthorized access into the cargo box.

It is common practice with a hard panel tonneau cover to connect the panels to one another with the use of an elongated hinge commonly referred to as a piano hinge. The attachment of a separate piano hinge to the hard panels requires an additional assembly operation. An alternative approach to adding a separate hinge is to form an elongated piano hinge as a part of the extruded panel frame member. Once the frame member is extruded, an additional operation must be performed to cutout portions of the hinge barrel to allow two hinge members to be meshed with one another and have a hinge pin inserted therein.

It is thus another objective of the present invention to provide an improved hinge for the hard panel tonneau cover which is simple and easy to construct and which provides an attractive finished appearance.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
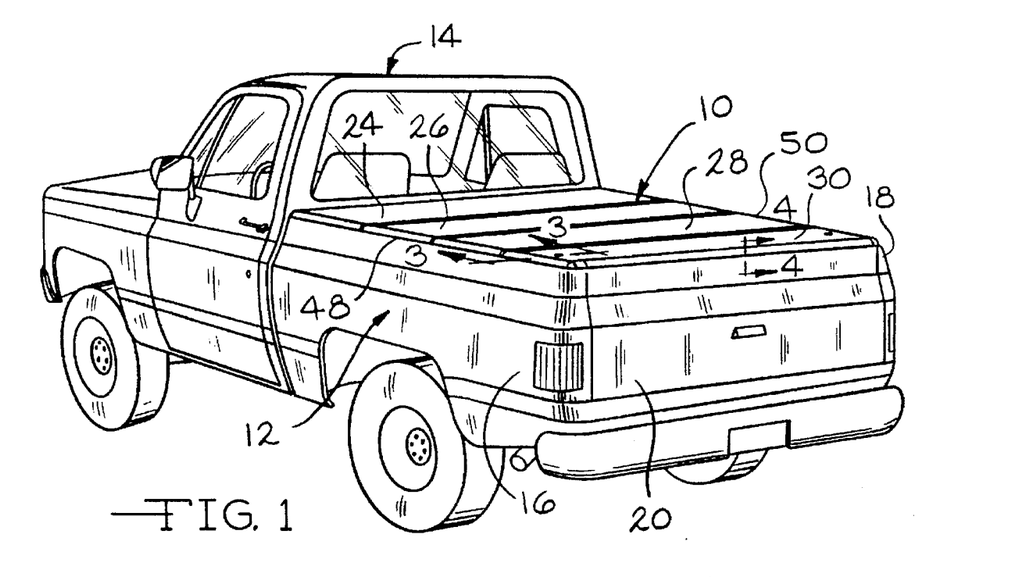
FIG. 1 is a perspective view of a pickup truck having the folding hard panel tonneau cover of the present invention installed on the cargo box thereof showing the box covered.
Figure 2:
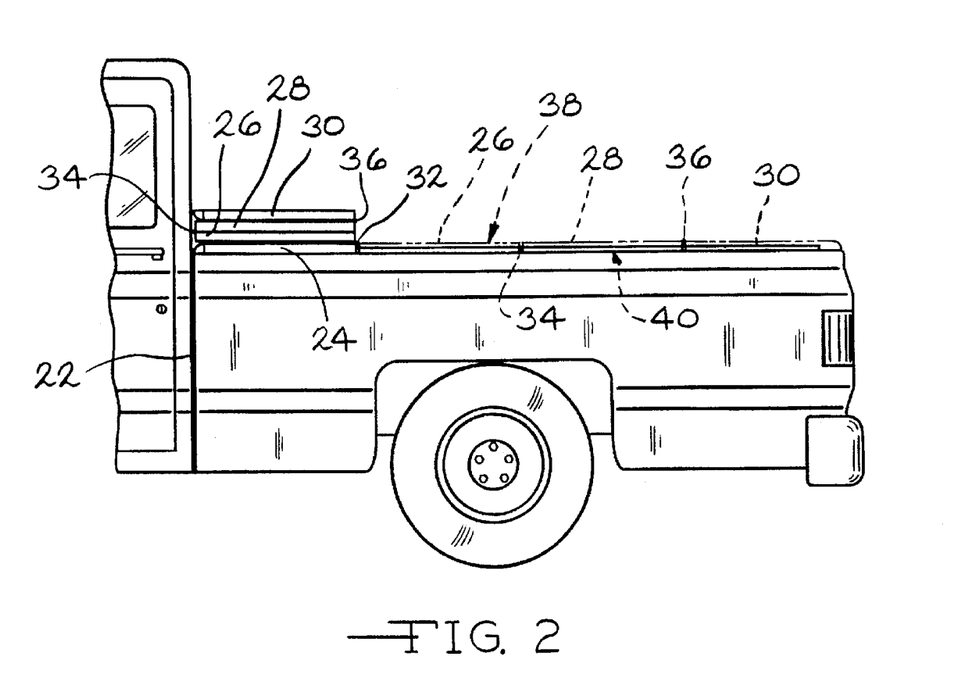
FIG. 2 is a side view of the pickup truck cargo box showing the cover in a folded position thus opening the cargo box.

The folding tonneau cover of the present invention is shown in FIG. 1 and designated generally at 10. The cover 10 is installed on the cargo box 12 of a conventional pickup truck 14. The cargo box 12 includes a pair of side walls 16, 18, a rear tailgate 20 and a front wall 22 (shown in FIG. 2). The cargo box is normally open from above and is covered by the tonneau cover 10 of the present invention. The cover 10 is supported upon the side walls, front wall and tailgate of the cargo box, covering the open upper end of the cargo box.

The tonneau cover 10 of the present invention is constructed of four hard panels 24, 26, 28, 30. The panels extend transversely across the cargo box from one side wall to the other. The front panel 24 and the adjacent intermediate panel 26 are joined by a hinge 32. The two intermediate panels 26, 28 are joined by a hinge 34. The intermediate panel 28 and the rear panel 30 are joined by a hinge 36. All of the hinges have a pivot axis which extends transversely across the cargo box between the side walls. The hinges 32, 36 are configured so that the pivot axis is generally at the top surface 38 of the tonneau cover. The hinge 34 has a pivot axis generally at the bottom surface 40 of the tonneau cover. This hinge arrangement enables the cover to be folded in an accordion-style fashion by pivoting the panels about the hinges. The panels are then stacked upon one another as shown in solid line in FIG. 2 to open the cover for access to the cargo area. The hinges will be described in detail below.

Along the side edges 48, 50 of the cover, which edges lie on top of the side walls 16, 18 of the cargo box, each panel is provided with an extruded frame member 52. The front edge of the forward most panel 24 has a front frame member 171. The rear edge 164 of the rearward most panel 30 has a rear frame member 165. The side frame members 52, the front frame member 171 and the rear frame member 165, all have the same cross-sectional shape. Intermediate frame members are on the remaining front and rear edges of each panel. The hinges are integrally formed with the intermediate frame members.

Figure 3:
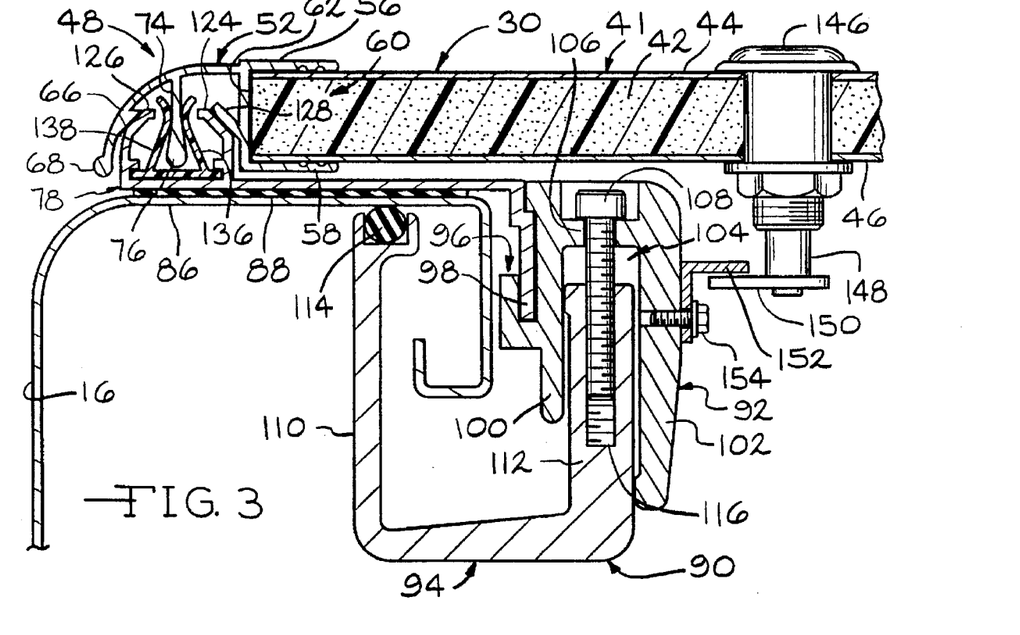
FIG. 3 is a sectional view of the cargo box side wall and an edge portion of the tonneau cover as seen from substantially the line 3—3 of FIG. 1.

In FIG. 3, the construction of the hard panels is shown in greater detail with reference to panel 30. The panel 30 includes a board 41 having a rigid core 42 made of polystyrene foam or similar foam resin and aluminum or fiberglass skins 44, 46, forming the top and bottom surfaces 38, 40, respectively. The frame member 52 has a vertical center wall 54 with a pair of vertically spaced legs 56, 58 extending inwardly from the center wall, toward the board 41, forming a generally C-shaped channel 60. The channel 60 receives the edge portion of the foam board 41 to cover the exposed foam at the side edge 62 of the board. An adhesive 64 is placed within the channel 60 between the board and the frame member to join the frame member to the board.

An outer lip 66 extends outwardly from the vertical center wall 54, away from the board 41 generally opposite from the upper leg 56 of the C-shaped channel 60. The lip 66 extends outwardly and then gradually curves downwardly and terminates in an enlarged bead 68. The bead 68 is at approximately the same vertical height as the lower leg 58 of the C-shaped channel 60. As will be described in greater detail below, the panels are lifted by pulling upward on the lip 66. The enlarged bead 68 provides a smooth rounded surface to avoid any sharp edges. The lip 66 forms a channel 70 which is generally open from below.

Extending downwardly into the channel 70 from the lower surface 72 of the lip 66, is a flange or tongue 74. The tongue 74 increases in thickness to an enlarged distal end 76. The tongue 74 latches to a rail structure 78 (described below) which is, in turn, attached to the cargo box side wall 16.

The rail structure 78 includes an extruded aluminum rail 80 and a plastic seal member 82. The extruded rail 80 has a horizontal wall 84 which sits upon the horizontal top wall 86 of the cargo box side wall 16. A foam gasket 88 is placed between the top wall 86 and the horizontal wall 84 of the rail to provide a seal therebetween and also to prevent scratching of the cargo box paint. The rail structure 78 is an elongated member extending the length of the cargo box side wall. The rail structure is clamped to the cargo box side wall by a plurality of clamps 90 which are spaced periodically along the length of the rail structure.

The clamps 90 include two members, a first clamp member 92 and a second clamp member 94. The first clamp member 92 is formed with a slot 96 configured to receive a mounting portion 98 of the extruded rail 80. A variety of alternative configurations of the rail 80 and first clamp member 92 can be used to join the two without departing from the invention. The first clamp member 92 is installed on the rail by sliding the clamp member onto the end of the rail and then positioning the clamp member at the desired location along the rail 80. A variety of alternative configurations of the rail 80 and first clamp member 92 can be used to join the two without departing from the present invention. The first clamp member 92 has a pair of spaced legs 100, 102 forming a pocket 104 therebetween. The pocket 104 is open from below and is closed at the top by wall 106. The wall 106 has an aperture therethrough for receiving a bolt 108.

The second clamp member 94 is generally U-shaped having spaced legs 110, 112. The upper end of leg 110 has a groove for mounting an O-ring 114 which bears against the lower surface of the top wall 86 of the cargo box side wall 16. The leg 112 is inserted into the pocket 104 of the first clamp member and has an elongated bore 116 which receives the bolt 108. The bolt 108 is tightened into the bore 116, drawing the second clamp member upward until the rail 80 and the leg 110 are drawn tightly against opposite sides of the top wall 86 of the cargo box side wall, thus holding the rail firmly in place on the cargo box.

The rail 80 has a pair of walls 118, 120 which extend upwardly from the horizontal wall 84 of the rail. The outer upstanding wall 120 is at the outer edge of the extruded rail 80, furthest from the cargo box. The inner upstanding wall 118 is spaced inwardly from the outer wall 120. The inner and outer upstanding walls form a trough 122 therebetween which is open from above. The inner and outer walls 118, 120, near their upper ends, are inclined or tapered toward one another, forming inclined upper surfaces 124, 126 on the walls 118, 120, respectively.

The frame members 52 on the side edges of the hard panels include an inclined flange 128 which extends from the vertical wall 54 into the channel 70. This flange lower surface engages the upper surface 124 of the upstanding wall 118 when the cover is in place, closing the cargo box. Likewise, the outer lip 66 has an inclined lower surface portion 130 which engages the inclined upper surface 126 of the outer upstanding wall 120. These inclined surfaces are bearing surfaces, supporting the weight of the tonneau cover panels. Thus, the rail is also a support member for the tonneau cover panels. The engaged bearing surfaces also form seals to prevent water from entering into the cargo box.

Figure 3A:
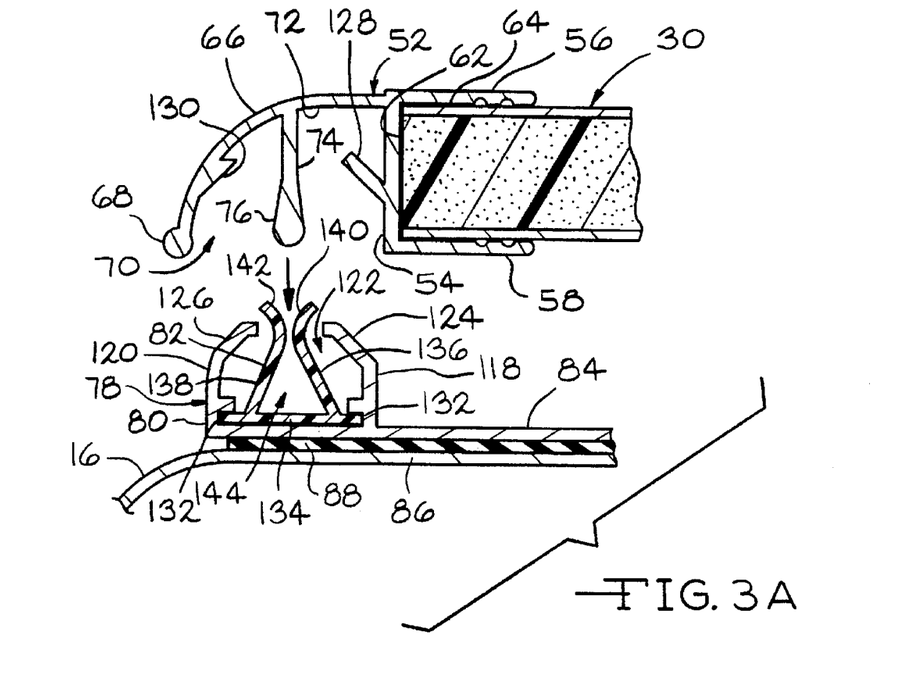
FIG. 3A is an enlarged perspective view like FIG. 3 showing the edge portion of the tonneau cover and the rail separated from one another.

The rail 80, between the two upstanding walls, at the base of a trough 122, is formed with a pair of slots 132 for attaching the plastic seal member 82 to the extruded rail 80. The plastic seal member 82 has a base portion 134 and a pair of walls 136, 138 extending upwardly from the base portion. The walls are spaced apart at the base portion 134 and are inclined upwardly and toward one another. The walls then flare outwardly from one another at their upper ends 140, 142, respectively. The seal member 82 is made of polyethylene, polypropylene, PVC or other suitable plastic resin. The walls 136, 138 are flexible so they can be deflected away from one another. The walls 136, 138 cooperate with one another to form a receiving pocket 144 therebetween which receives the distal end 76 of the tongue 74 when the cover is closed on the cargo box. The enlarged distal end 76 of the tongue requires that the walls 136, 138 be deflected away from one another to insert the tongue into the receiving pocket 144. Likewise, the walls must also be deflected away from one another to remove the tongue from the pocket. The tongue and seal member are configured to require a minimum force before the panels can be lifted from the cargo box side wall. The tongue and seal member thus function as a latch to fasten or attach the panels to the rail structure 78 and therefore to attach the panels to the cargo box.

The force necessary to separate the walls and remove the tongue is sufficiently high so that wind forces acting on the tonneau cover, during operation of the truck or during high wind conditions, are not sufficient to lift the panels from the cargo box. The tongue and plastic seal member also act as an additional seal to prevent water entrance into the cargo box.

Figure 5:
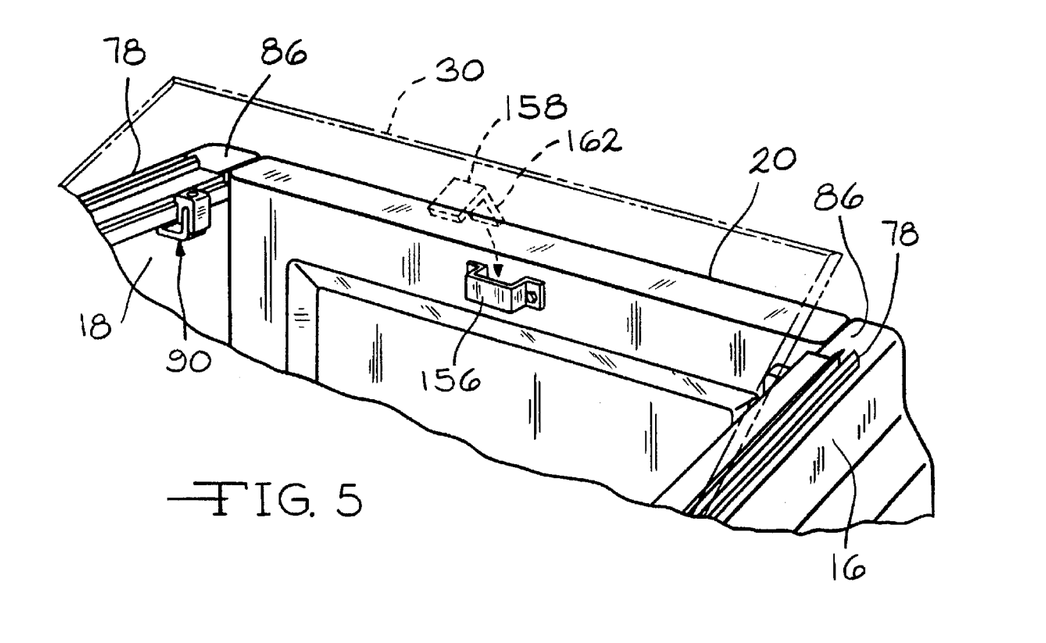
FIG. 5 is a perspective view showing the rear portion of the tonneau cover with the seal member omitted from the rails illustrating a catch to prevent opening of the tailgate when the folding tonneau cover is in a closed position covering the cargo box.

As described previously, the cargo box is opened by lifting the cover, starting with either the rear panel 30, and folding the cover in an accordion-style fashion. The rear panel 30 is provided with a cylinder lock 146 along each side to secure the cover in a closed position over the cargo box. The cylinder locks are operable by a key to rotate a lock shaft 148 which turns a lock plate 150. The clamp member 92 has a tab 152 attached thereto by a bolt 154. The tab 152 extends inwardly into the cargo box. The lock plate 150 is turned to be positioned beneath the tab 152 to prevent vertical lifting of the panel 30 from the cargo box.

The tailgate 20 is locked in its upright position by a bracket 156 and a catch 158. The bracket 156 is bolted to the inner side of the tailgate, near its upper end and forms a pocket 160. The catch 158 is attached to the lower surface 40 of the panel 30 and has a leg 162 extending vertically downward from the panel 30. This leg 162 fits into the pocket 160 to prevent the tailgate 20 from being pivoted from its upright closed position to an open horizontal position extending rearward from the cargo box. Thus, with the cover locked in place closing the top of the cargo box, the tailgate is prevented from opening as well, preventing entry into the cargo box.

Figure 4:
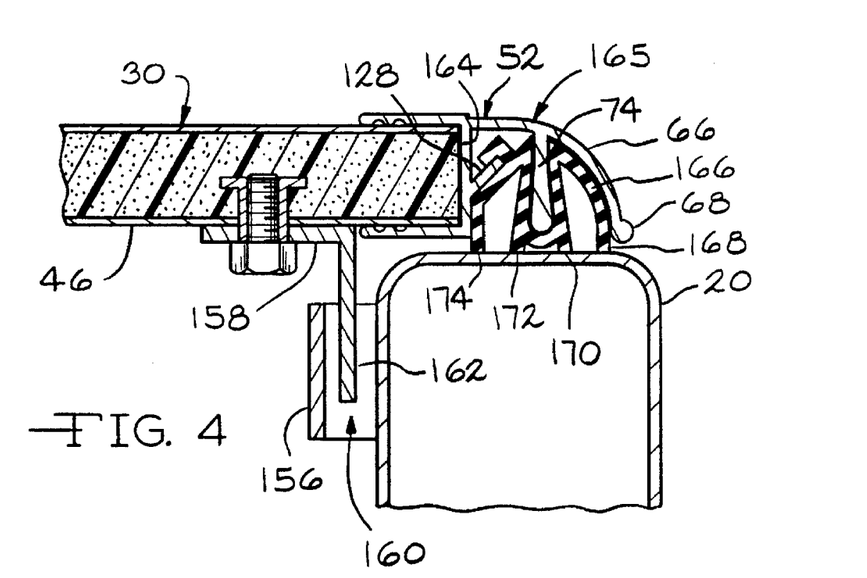
FIG. 4 is a sectional view as seen from substantially the line 4—4 of FIG. 1 showing the rear of the tonneau cover sealed to the top of the cargo box tailgate.

The above described latch only attaches the cover to the rails 80 extending along each of the cargo box side walls. There is no need to latch the front panel to the cargo box front side wall or the rear panel to the tailgate. However, it is still necessary to provide a water tight seal between the tonneau cover and the tailgate and cargo box front wall. With reference to FIG. 4, a seal structure is shown for producing a water tight seal. The seal shown is in connection with the rear panel 30 and the tailgate 20. The identical structure is used with the front panel 24 and the front wall 22 of the cargo box.

The rear edge 164 of the panel 30 is provided with a rear frame member 165 identical in section to the side frame member 52 shown and described in connection with FIG. 3. The frame member 165 is adhesively joined to the panel 30 in the same manner as described above as well. However, there is no rail structure mounted to the top of the tailgate 20 for engagement by the frame member 52. Instead, a rubber seal 166 is mounted to the rear frame member 165 in the channel 70 formed by the outer lip 66. The rubber seal engages the lower side of the lip 66 between the enlarged bead 68 and the tongue 74. The seal completely encapsulates the tongue 74 and substantially encapsulates the inclined flange 128 and the lower portion of the vertical wall 54. The seal forms a total of four legs 168, 170, 172, 174 which project downwardly and engage the top surface of the tailgate. As a result, there are four separate seals formed between the panel 30 and the tailgate to prevent water from entering the cargo box.

Figure 6:
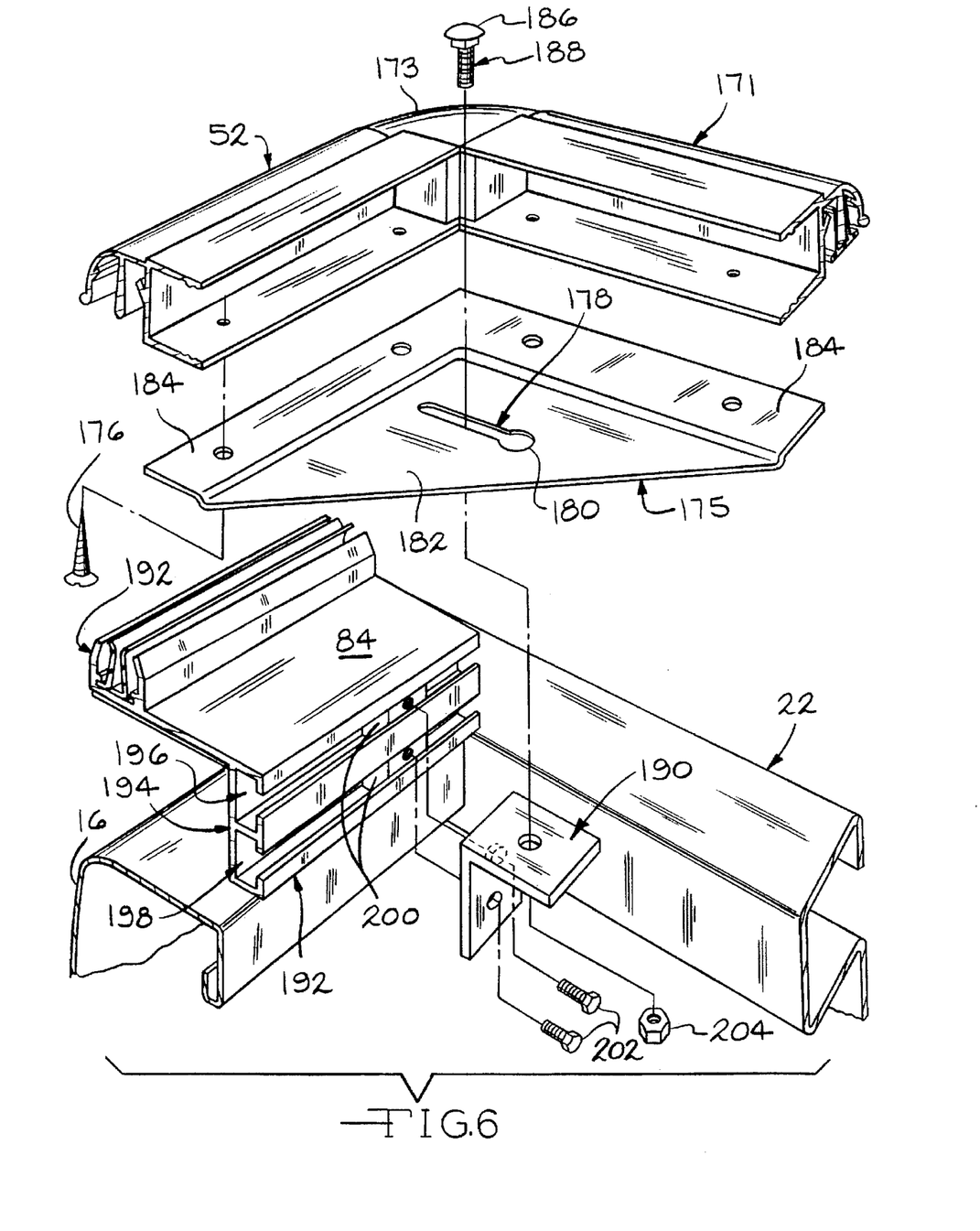
FIG. 6 is an exploded perspective view of one front corner of the tonneau cover illustrating the attachment of the tonneau cover to the rail structure of the tonneau cover.

The attachment of the front panel 24 to the pickup cargo box is shown with reference to FIG. 6. The front panel 24 has a frame member 52 along each side and a front frame member 171 along its front edge. At each of the two front corners 173 of the tonneau cover, a tie down plate 175 is attached to the lower edge of the frame members 52, 171 by a plurality of screws 176. The tie down plate 175 has a key hole slot 178 that is generally parallel to the front edge of the tonneau cover and that has an enlarged opening 180 at one end. The key hole slot 178 is in a center portion 182 of the tie down plate which is recessed below the edge portions 184 of the tie down plate. It is the edge portions 184 that are attached to the side and front frame members of the panel 24.

A carriage bolt 188 is inserted into the slot 178 by inserting the bolt head 186 through the enlarged opening 180 in the slot. The recessed center portion 182 of the tie down plate allows for clearance of the bolt head 186 between the tie down plate and the lower surface 40 of the front panel 24.

The carriage bolt 188 is bolted to an angle bracket 190 which is in turn bolted to the extruded rail that is clamped to the pickup box side wall. The rail 192 is an alternative embodiment of the rail and differs slightly from the rail 80 shown above in FIG. 3. The rail 192 has a horizontal wall 84 which overlies the top of the pickup box side wall. Along its inner edge, the rail 192 includes a downturned flange 194 which extends into the cargo box. The downturned flange 194 includes a pair of channels 196, 198 which run the length of the rail, one above the other. Two channels 196, 198 can be used to mount one of the clamp members that attach the rail to the cargo box. In addition, other accessories can be mounted to the rail by nuts 200 which can be slid through the channels 196, 198. The angle bracket 190 is attached to the rail 192 with a pair of bolts 202 which are threaded into a pair of nuts 200 disposed in the channels 196, 198 in the rail 192. The carriage bolt 188 is secured to the angle bracket 190 with a nut 204.

Figure 7:
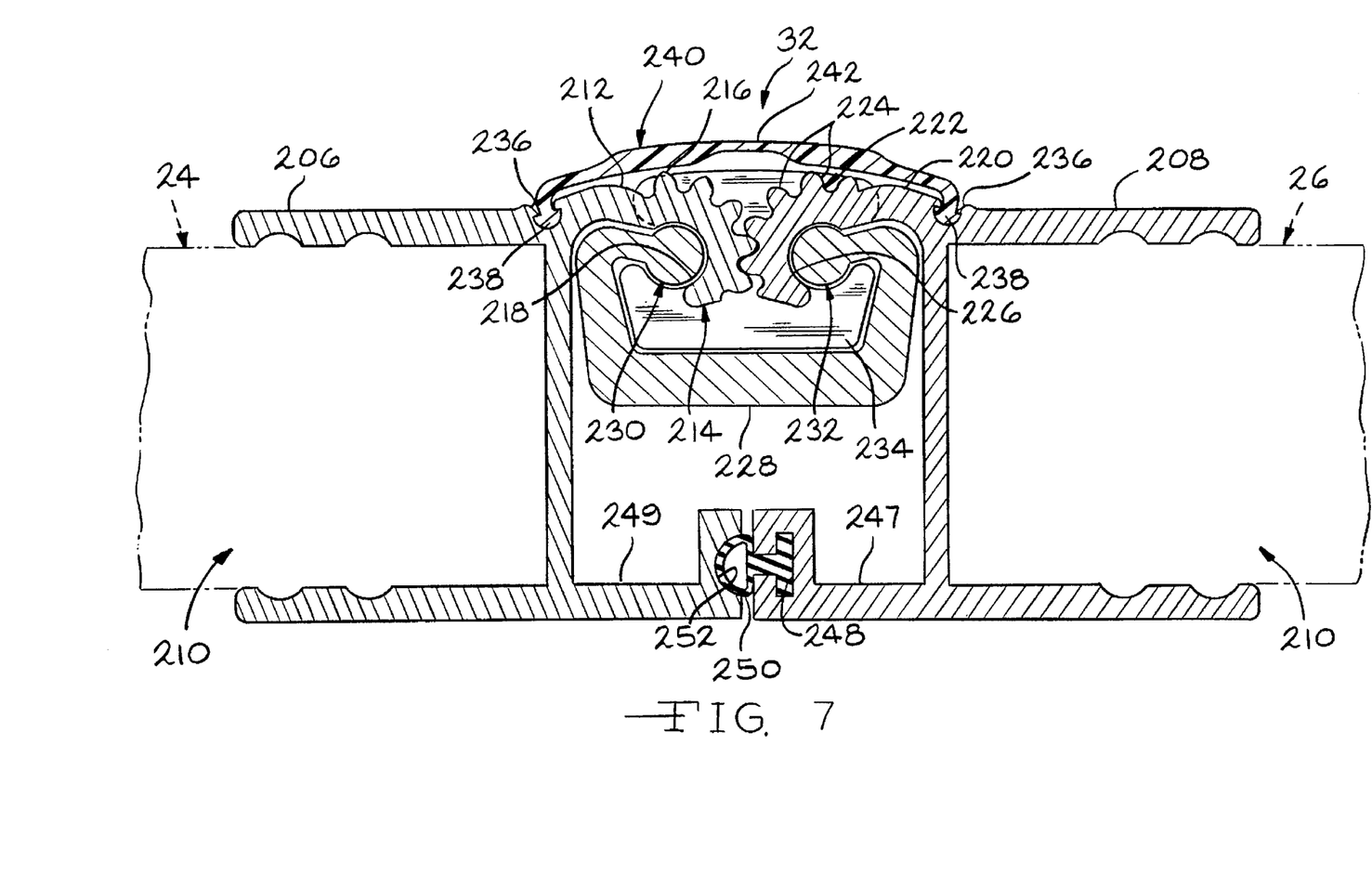
FIG. 7 is an enlarged elevational view of a hinge between the panels of the tonneau cover illustrating the cover in a closed position covering the cargo box.
Figure 8:
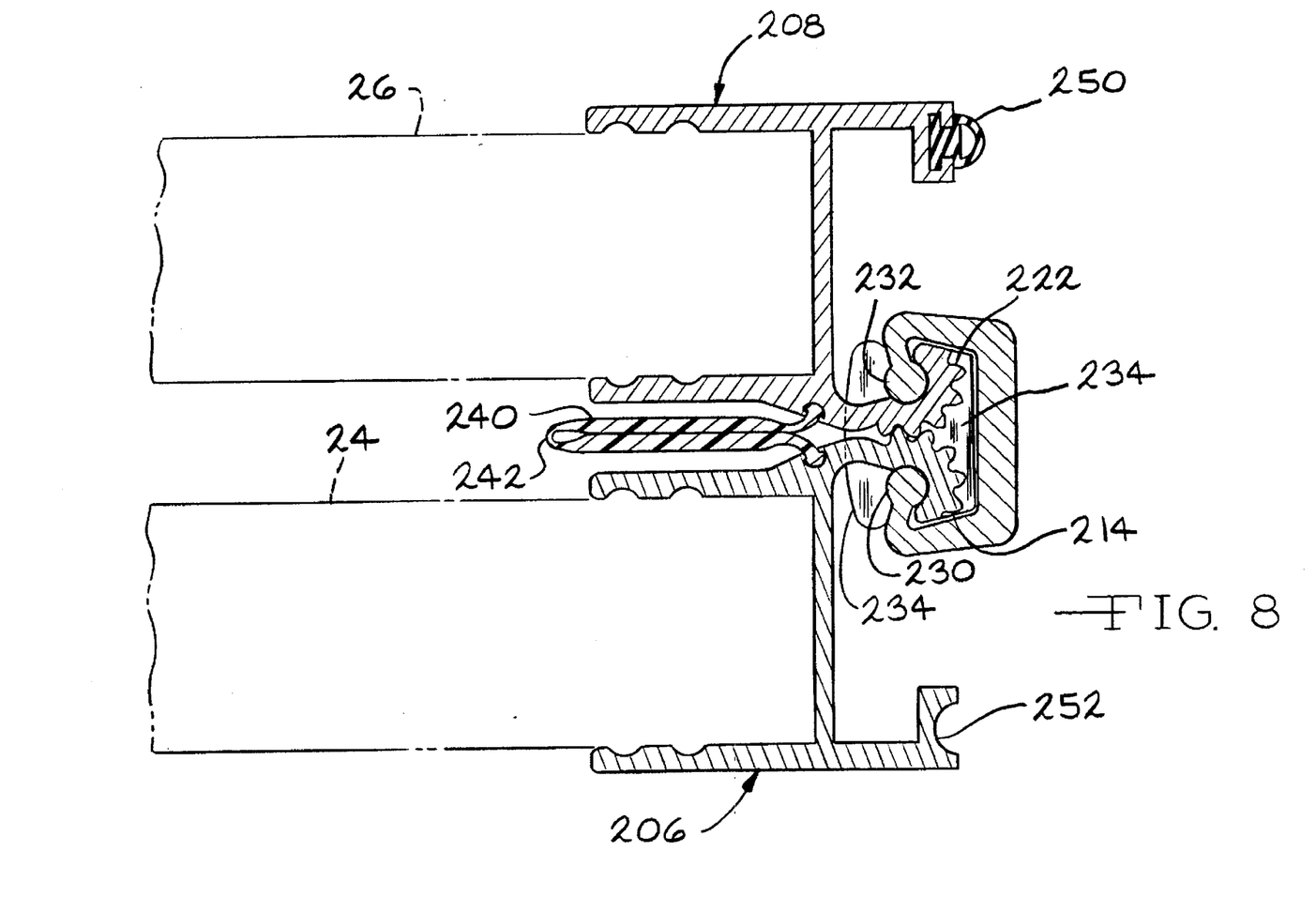
FIG. 8 is an enlarged elevational view of a hinge with the tonneau cover in an open position.

Continuous gear hinges, which couple the panels together, are shown in FIGS. 7 and 8. In FIG. 7, the continuous gear hinge 32 is shown in a sectional view. The hinge 32 joins the front panel 24 and the adjacent panel 26 together. The panel 24 has a rear edge frame member 206 while the panel 26 has a front edge frame member 208. Each of the frame members 206, 208 form a C-shaped channel 210 into which an edge of the board 41 is inserted. The frame members 206, 208 are aluminum or other material extrusions, having a uniform sectional shape. The frame member 206, along the upper surface of the panel 24, has a rearwardly extending projection 212 which terminates in a gear sector 214 having a plurality of gear teeth 216. The gear sector 214 has a hollow center, forming an open, partial cylindrically shaped channel 218. The front edge frame member 208 of the panel 26 likewise has a forwardly extending projection 220 which forms a second gear sector 222 having a plurality of teeth 224. The gear sector 222 also has a hollow center, forming an open partial cylindrically shaped channel 226.

The hinge 32 is assembled by bringing the two gear sectors 214, 222 into mesh with one another along the lengths of the frame members. An extruded channel member 228, that is generally C-shaped, has a pair of cylindrical beads 230, 232 which are slid into the cylindrical channels 218, 226 formed by the two gear sectors. The channel member 228 holds the two gear sectors in mesh with one another. As the panel 26 is lifted and rotated relative to panel 24, the gear sector 222 travels around the gear sector 224 to the relative position shown in FIG. 9. The frame members, with the gear sectors, form the two leaves of the hinge and are joined together by the channel member.

At periodic locations along the lengths of the frame members 206, 208, a portion of the gear sectors are cut away. Bearings 234 are placed in these cutout portions. The bearings have cylindrically shaped channels, like those formed by the gear sectors, through which the beads 230, 232 of the channel member 228 are inserted, to hold the bearings in place. The bearings can be made from a variety of materials. A preferred material is acetal. The bearings transfer axial loads from one panel to the other panel.

The frame members 206, 208 each have a groove 236 on their upper surfaces. The grooves 236 are for receiving the enlarged edges 238 of a seal 240. The seal 240 is a long flexible member that arches upwardly from its enlarged edges 238 over the two gear sectors 214, 222. A center portion 242 of the seal is slightly thinner than the remainder of the seal. This thinner center portion facilitates bending of the seal during rotation of the hinge 32. Since the seal 240 is arched above its edges 238, as the hinge is rotated to lift the panel 26, moving the two seal edges 238 toward one another, the natural tendency of the arched seal is to bend upward, away from the gear sectors. The bent seal 240 is shown in FIG. 9 with the seal 240 folded in half, upon itself. The seal 240 prevents water and dirt from entering into the hinge which can adversely affect operation of the hinge.

Along the lower surface 40 of the panels 24, 26, the frame member 208 has a flange 247 which extends toward the panel 24. The distal end of the flange 247 has a mounting groove 248 that carries a seal 250. The seal 250 extends from the flange 247 and contacts the end of a flange 249 of the frame member 206, which extends toward the frame member 208. The flange 249 has a depression 252 which is contacted by the seal 250. The seal 250 prevents any debris from entering the hinge from the opposite side of the panels 24, 26.

The hinge 36 between the panels 28, 30 is identical in nature and structure to the hinge 32. The hinge 34, however, is a vertical mirror image of the hinges 32, 36. The gear sectors of the hinges 34 are located at the lower surface of the panels 26, 28 and the seal 250 is located at the upper surface of the panels. The flipped arrangement of the hinge 34 enables the panel 28 to be folded to lay on the lower surface of the panel 26 when the cover is folded in an accordion-style fashion.

The use of a gear hinge results in a simple, low cost hinge structure for the hard panel tonneau cover. The hinge components are made as long extrusions and are cut to the desired length. In addition, the gear sectors are integrally formed as part of the frame members along the edge of the hard panels. This results in a simple construction and avoids the need to attach a separate hinge to the panel frame members.

It is to be understood that the invention is not limited to the exact construction illustrated and described above, but that various changes and modifications may be made without departing from the spirit and scope of the invention as defined in the following claims.

We claim:

1. A foldable hard panel tonneau cover for a pickup truck cargo box, the cargo box having a spaced apart upright side walls, an upright front wall and a tailgate forming an upright rear wall, the side, front and rear walls of the cargo box having upper ends, said tonneau cover comprising:

two or more hard panels pivotally connected to one another to fold in an accordion-style fashion, each of said panels having side edges overlying the upper ends of the cargo box side walls;

a pair of elongated rails, one rail of said pair disposed upon and attached to one of the cargo box side walls and the other rail of said pair disposed upon and attached to the other cargo box side wall, said rails extending substantially the length of each of the cargo box side walls between the front wall and tailgate; and elongated latch means operatively associated with said rails and said panels at said side panels for releasably attaching said panels to said rails, said elongated latch means extending substantially along the length of said rail and along said side edges of said panels and said latch means requiring a predetermined minimum force to remove said panels from said rails whereby said panels are releasably attached to the cargo box.

2. The tonneau cover of claim 1 wherein said latch means forms a substantially water tight seal between said panels and said rails.

3. The tonneau cover of claim 1 wherein:

said panels each include a board and frame members attached to said board along said side edges thereof; and said latch means includes a flange projecting downwardly from each said frame member and having an enlarged distal end and said latch means further including a receiving pocket mounted to each of said rails, said receiving pockets being formed by a pair of deflectable walls, said receiving pockets receiving said enlarged distal ends of said flanges upon deflection of said deflectable walls away from one another, said distal ends of said flanges being removed from said receiving pockets upon deflection of said deflectable walls away from one another whereby said deflectable walls produce said minimum force for removal of said panels from said rails.

4. The tonneau cover of claim 3 wherein said flanges extend substantially along the entire length of said side edges of said panels and said receiving pockets extend substantially along the lengths of the cargo box side walls.

5. The tonneau cover of claim 3 wherein said frame members along said side edges of each of said panels generally cover said rails to divert water away from said rails.

6. The tonneau cover of claim 3 wherein said deflectable walls of said receiving pockets are formed by seal members with one seal member attached to each of said rails, said seal members having a pair of upstanding walls.

7. The tonneau cover of claim 6 wherein said seal members each have a generally horizontal base portion coupled to one of said rails and said deflectable walls of each seal member extend upwardly from said base portion and taper toward one another toward an open end of said receiving pocket.

8. The tonneau cover of claim 7 wherein said deflectable walls flare away from one another at said open end of said receiving pocket.

9. The tonneau cover of claim 6 wherein said seal member is a plastic extrusion.

10. The tonneau cover of claim 1 further comprising seal means for providing a water tight seal between a front edge of a forwardmost one of said panels and the upper end of the cargo box front wall and for providing a water tight seal between a rear edge of a rearmost one of said panels and the upper end of the cargo box tailgate, said seal means including a front frame member at said front edge of said forwardmost panel and a rear frame member at said rear edge of said rearmost frame member and front and rear seal members attached to said front and rear frame members, respectively, for sealing engagement with said front wall and said tailgate of said cargo box, said front and rear members having multiple, spaced apart, downwardly projecting legs engagable with the cargo box front wall and tailgate.

11. A foldable hard panel tonneau cover for a pickup truck cargo box, the cargo box having spaced apart upright side walls, an upright front wall and a tailgate forming an upright rear wall, the side, front and rear walls of the cargo box having upper ends, said tonneau cover comprising:

two or more hard panels pivotally connected to one another to fold in an accordion-style fashion, each of said panels having side edges overlying the upper ends of said side walls;

continuous gear hinges connecting said two or more panels to one another, each gear hinge having first and second hinge leaves, each leaf having a gear sector and each hinge further having a channel member holding said gear sectors of said first and second hinge leaves in mesh with one another;

a pair of elongated rails, one rail of said pair disposed upon one of said side walls and the other rail of said pair disposed upon the other of said side walls, said rails extending substantially the length of each of the cargo box side walls between the front wall and the tailgate, said rails having a horizontal wall overlying the upper ends of the side walls and inner and outer upwardly projecting walls, said outer wall disposed furthest from the cargo box and the inner wall spaced inwardly from said outer wall and closer to the cargo box, said inner and outer walls forming a trough therebetween;

clamp means for clamping said rails to said side walls;

a seal member mounted to said rail horizontal wall within said trough and having a pair of upwardly projecting deflectable walls forming a receiving pocket therebetween;

a frame member at each side edge of said panels having a lip substantially covering said trough of each rail; and a flange projecting downwardly from said lip for insertion into said receiving pocket by deflection of said seal member walls from one another whereby said flange is attached to said seal member to hold said panels on said cargo box side walls.

12. The tonneau cover of claim 11 wherein said flange and said seal member form a substantially water tight seal between said panels and said rails.

13. The tonneau cover of claim 11 wherein said inner and outer upwardly projecting walls of said rails have upper end portions which taper toward one another forming inclined surfaces and wherein said frame members at said side edges of said panels having inclined surfaces for engagement with said inner and outer walls for supporting said panels upon said rails.

14. The tonneau cover of claim 11 wherein said first and second hinge leaves are integrally formed with intermediate frame members attached to adjacent edges of two of said panels.

\* \* \* \* \*

UNITED STATES PATENT AND TRADEMARK OFFICE
CERTIFICATE OF CORRECTION

PATENT NO. : 5,636,893
DATED : June 10, 1997
INVENTOR(S) : Donald E. Wheatley and Donald G. Wheatley It is certified that error appears in the above-indentified patent and that said Letters Patent is hereby corrected as shown below:

Column 8, line 20, claim 1, after "said panels at said side", please insert —edges of said—.

Signed and Sealed this

Sixth Day of January, 1998

Attest:

BRUCE LEHMAN

Attesting Officer

Commissioner of Patents and Trademarks